United States Patent
Fujishima et al.

(10) Patent No.: US 7,141,733 B2
(45) Date of Patent: Nov. 28, 2006

(54) KARAOKE APPARATUS, CONTENT REPRODUCING APPARATUS, METHOD OF MANAGING MUSIC PIECE DATA FOR A KARAOKE APPARATUS, AND METHOD OF MANAGING CONTENT DATA FOR CONTENT REPRODUCING APPARATUS

(75) Inventors: Masakazu Fujishima, Hamamatsu (JP); Minoru Ogita, Hamamatsu (JP); Shingo Kamiya, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 09/968,818

(22) Filed: Oct. 2, 2001

(65) Prior Publication Data

US 2002/0038598 A1 Apr. 4, 2002

(30) Foreign Application Priority Data

Oct. 2, 2000 (JP) ............................ P.2000-301904

(51) Int. Cl.
*A63H 5/00* (2006.01)
*G04B 13/00* (2006.01)
*G10H 7/00* (2006.01)
(52) U.S. Cl. .................. 84/609; 434/307 A; 705/71
(58) Field of Classification Search ............ 434/307 A; 705/55; 707/51, 77; 84/609
See application file for complete search history.

(56) References Cited

U.S. PATENT DOCUMENTS

| | | | | |
|---|---|---|---|---|
| 5,296,643 A | * | 3/1994 | Kuo et al. ............... | 434/307 A |
| 5,953,005 A | * | 9/1999 | Liu ........................ | 434/307 A |
| 6,075,858 A | * | 6/2000 | Schwartzman ............... | 705/52 |
| 6,289,102 B1 | * | 9/2001 | Ueda et al. .................. | 380/201 |
| 6,552,254 B1 | * | 4/2003 | Hasegawa et al. ............ | 84/609 |
| 6,570,080 B1 | * | 5/2003 | Hasegawa et al. ............ | 84/609 |
| 6,671,808 B1 | * | 12/2003 | Abbott et al. ............... | 713/200 |
| 2002/0087870 A1 | * | 7/2002 | Rick .......................... | 713/189 |

\* cited by examiner

*Primary Examiner*—Jeffrey W Donels
(74) *Attorney, Agent, or Firm*—Pillsbury Winthrop Shaw Pittman LLP

(57) ABSTRACT

Music piece data of so-called managed music pieces, each of which requires allowance of performance for each karaoke apparatus are stored in a hard disk in the same manner as music piece data of other karaoke music pieces. A ROM (20), which has stored therein key data for allowing performance of a managed music piece, is produced for each of the managed music pieces and for each of karaoke apparatuses. Performance of a managed music piece is allowed by setting a corresponding ROM (20) into a karaoke apparatus. Accordingly, a karaoke apparatus is not required to have a medium such as a CD-ROM for each of managed music pieces, and the copyright holder of a managed music piece can physically manage the number of allowed performances by way of the ROM (20).

15 Claims, 6 Drawing Sheets

| MUSIC PIECE NUMBER | DIRECTORY | TITLE | MANAGED MUSIC PIECE FLAG |
|---|---|---|---|
| xxxx-xx | dd/dd/dd | tttttt | NO |
| xxxx-xx | dd/dd/dd | tttttt | YES |
| xxxx-xx | dd/dd/dd | tttttt | NO |

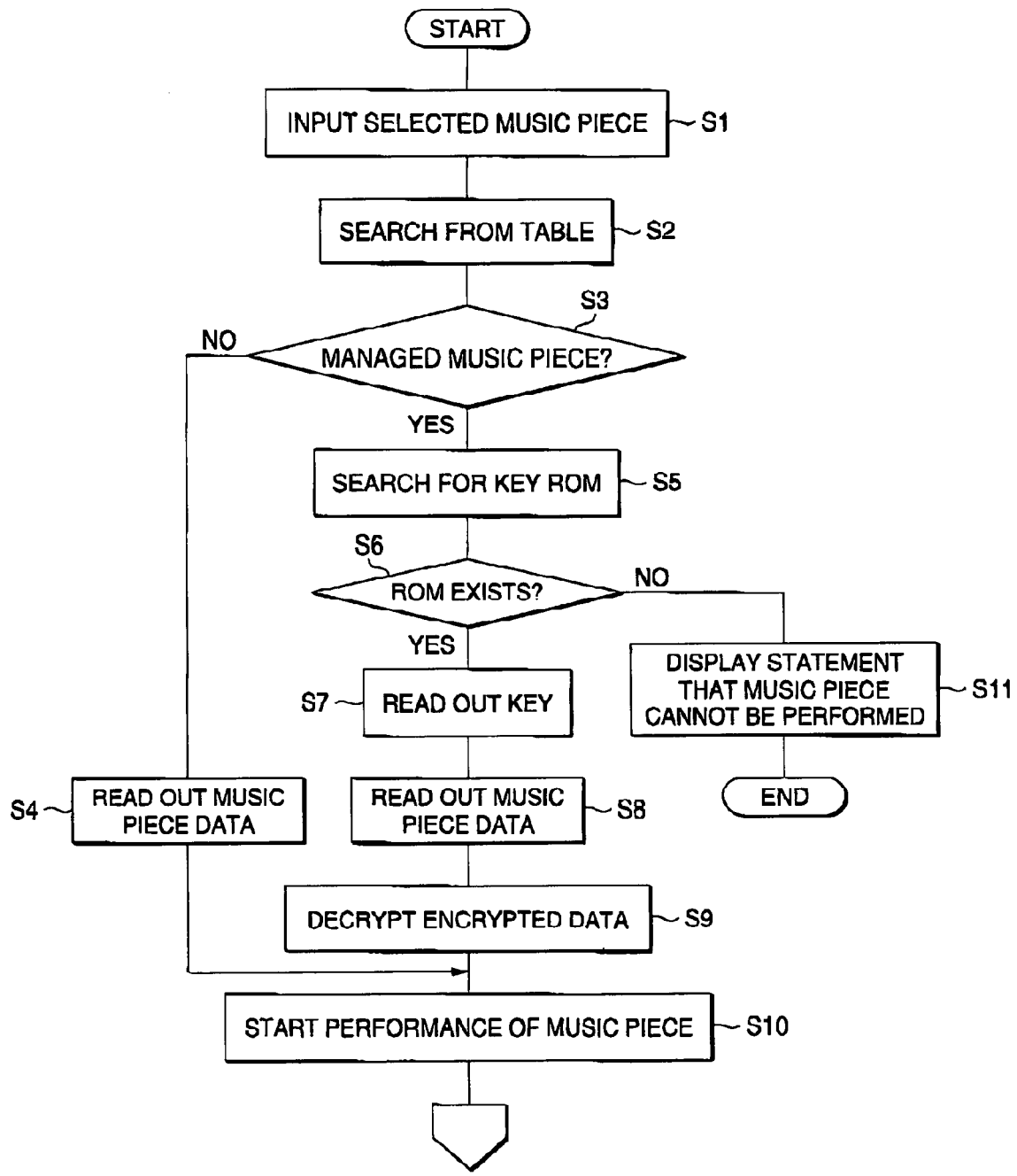

KEY DATA STORAGE AREA

KARAOKE APPARATUS, CONTENT REPRODUCING APPARATUS, METHOD OF MANAGING MUSIC PIECE DATA FOR A KARAOKE APPARATUS, AND METHOD OF MANAGING CONTENT DATA FOR CONTENT REPRODUCING APPARATUS

BACKGROUND OF THE INVENTION

1. Field of the Invention

The present invention relates to improvement of a method of managing music piece data for a karaoke apparatus, and also to that of a method of managing content data for a content reproducing apparatus.

The present application is based on Japanese Patent Application No. 2000-301904, which is incorporated herein by reference.

2. Description of the Related Art

A karaoke apparatus which is currently in widespread use is a so-called sound source karaoke apparatus in which a sound source or the like is driven by music piece data to generate performance [sound] of a karaoke music piece. At a request of the singer, a karaoke apparatus reads out karaoke music piece data stored in a storage device, such as a hard disk, and then performs the karaoke music piece.

Among karaoke music pieces, there are music pieces which are called managed music pieces. Unlike other karaoke music pieces which are always allowed to be performed, performance of each of such managed music pieces is individually allowed by the copyright holder, for each karaoke apparatus.

Such allowance is conducted in the following manner. The copyright holder produces CD-ROMs (i.e., Compact Disc-Read Only Memories) which store the music piece data, the number of which is equal to that of karaoke apparatuses. The CD-ROMs are loaded into the karaoke apparatuses, respectively, whereby the karaoke apparatuses are allowed to perform the music piece. In this way, the number of allowed apparatuses is managed by using physical media, i.e., the number of CD-ROMs.

In the above-described method, the production of such CD-ROMs for respective karaoke apparatuses requires much labor. Since there are a plurality of managed music pieces, the above-described method has a further problem in that, when CD-ROMs of the managed music pieces are loaded into each karaoke apparatus, a disc changer of the karaoke apparatus is filled with the discs of the managed music pieces, thereby causing a problem in that the disc configuration of the disc changer is very inefficient. A usual karaoke music piece is stored in a hard disk, and can be immediately read out therefrom on request. By contrast, with respect to a managed music piece, the process of reading the data of the music piece which is stored on a CD-ROM cannot be started until the CD-ROM is instructed to be loaded into a disc changer and the loading is completed. Consequently, there arises a problem in that a long time period must elapse before a state where a performance in response to a request can be started.

There are a large number of karaoke music pieces which can be performed by a karaoke apparatus. Some of karaoke music pieces are required to be performed only by specific apparatuses. For example, Okinawan folk songs are requested to be performed only by karaoke apparatuses installed in the Okinawa district of Japan. In this manner, music pieces which are seemed to be performed are set in accordance with the district and the location so as to eliminate unnecessary music pieces, in order to reduce the burden of the copyright. However, it is very cumbersome to individually edit a program of music pieces which are to be stored in a hard disk of each of karaoke apparatuses. After a karaoke apparatus is installed, in order to allow new music pieces to be performed, a group of the music pieces must be downloaded to the karaoke apparatus, thereby producing a problem in that such configuring requires a very long time period.

Such configuuring is performed by writing music pieces corresponding to each of karaoke apparatuses onto a hard disk, or by downloading the music pieces from a distribution center. In the method, however, it is not easy to configure each apparatus, and downloading after installation requires much labor.

SUMMARY OF THE INVENTION

It is an object of the present invention to provide a karaoke apparatus and a method of managing music piece data for a karaoke apparatus in which key data is used to enable allowance/disallowance of performance of music piece data.

It is another object of the present invention to provide a content reproducing apparatus and a method of managing content data for the apparatus in which key data is used to facilitate management of content data.

According to a first aspect of the present invention, there is provided a karaoke apparatus which comprises a storage device having stored therein music piece data for performing karaoke music pieces, a medium connection device, to which a storage medium having stored therein key data for allowing performance of music piece data is to be connected, and a controlling device which performs music piece data when performance of the music piece data is requested, provided that the storage medium having stored therein key data corresponding to the music piece data is connected to the medium connection device.

According to a second aspect of the present invention, there is provided a method of managing music piece data for a karaoke apparatus. The method comprises the steps of: storing a plurality of music piece data in a storage device; and allowing performance of specific music piece data of the music piece data stored in the storage device, provided that a storage medium having stored therein key data for allowing performance of the specific music piece data is connected to a medium connection device.

In the first and second aspects of the present invention, even music pieces such as managed music pieces etc., which require individual allowance of performance, are stored in the storage device, such as a hard disk etc. Allowance/disallowance of performance of music piece data can be set by setting a storage medium having stored therein key data. According to the configuration thereof, a labor of producing media, such as CD-ROMs etc. for respective karaoke apparatuses can be eliminated. Each karaoke apparatus is not required to have a CD-ROM for each music piece, so that management of music pieces is facilitated. The storage medium which stores key data, may be any kind of medium including a semiconductor memory, an optical memory, etc.

According to a third aspect of the present invention, there is provided a karaoke apparatus which comprises a storage device having stored therein music piece data for performing karaoke music pieces, the storage device having a key data storage area which stores key data for allowing performance of music piece data, and a controlling device which performs music piece data when performance of the music piece data is requested, provided that key data corresponding to the music piece data is stored in the key data storage area of the storage device.

According to a fourth aspect of the present invention, the key data may be downloaded online.

According to a fifth aspect of the present invention, there is provided a method of managing music piece data for a karaoke apparatus. The method comprises the steps of: previously storing a plurality of music piece data in a storage device so as to respectively divide the music piece data into a plurality of groups; online receiving of key data for individually allowing performance of music piece data per the individual groups; and allowing performance of music piece data of at least one of the groups, provided that key data corresponding to the at least one of the groups has been received.

In the third to fifth aspects of the present invention, all music piece data are previously stored in a plurality of groups in the storage device, such as a hard disk etc. This is easily attained because recent large-capacity hard disks can be obtained at low prices. Allowance/disallowance of performance of each group is set by the key data. According to the configuration thereof, the same music piece data is written into all karaoke apparatuses, and hence it is not required to edit a program of music pieces for each of the karaoke apparatuses at shipment. Therefore, easier writing of music piece data is facilitated, and performance-allowed music pieces can easily be changed after shipment because it is requested by only downloading key data.

The above-described configurations can be applied also to a content reproducing apparatus, and audio data and visual data other than music piece data. In this case, the present invention may be configured in the following manner.

According to a sixth aspect of the present invention, there is provided a content reproducing apparatus which comprises a storage device having stored therein content data for reproducing at least one of audio and visual contents, a medium connection device to which a storage medium having stored therein key data for allowing reproduction of content data is to be connected, and a controlling device which judges, when reproduction of the contents is requested, as to whether key data is required for the contents, wherein if the controlling device judges that key data is required for the contents, then the controlling device performs reproduction of the content data, provided that a storage medium having stored therein key data corresponding to the content data is connected to the medium connection device.

According to a seventh aspect of the present invention, there is provided a content reproducing apparatus which comprises a storage device having stored therein content data for reproducing at least one of audio and visual contents, the storage device having a key data storage area which stores key data for allowing reproduction of the content data, and a controlling device performs reproduction of content data when reproduction of the content data is requested, provided that key data corresponding to the content data has been stored in the key data storage area of the storage device.

According to an eighth aspect of the present invention, the key data may be downloaded online.

According to a ninth aspect of the present invention, there is provided a method of managing content data for a content reproducing apparatus. The method comprises the steps of: storing a plurality of content data in a storage device; and allowing reproduction of a specific content data of the content data stored in the storage device, provided that a storage medium having stored therein key data for allowing reproduction of the specific content data is connected to a medium connection device.

According to a tenth aspect of the present invention, there is provided a method of managing content data for a content reproducing apparatus. The method comprises the steps of: previously storing a plurality of content data in a storage device so as to respectively divide into a plurality of groups; online receiving key data for individually allowing reproduction of content data per the individual groups; and allowing reproduction of content data of at least one of the groups, provided that key data corresponding to the at least one of the groups has been received.

BRIEF DESCRIPTION OF THE DRAWINGS

The above and other objects and advantages of the present invention will become more apparent by describing in detail preferred embodiments thereof with reference to the accompanying drawings, wherein:

FIG. 3 is a flowchart showing the operation of the karaoke apparatus;

DETAILED DESCRIPTION OF THE PREFERRED EMBODIMENTS

Figure 1:
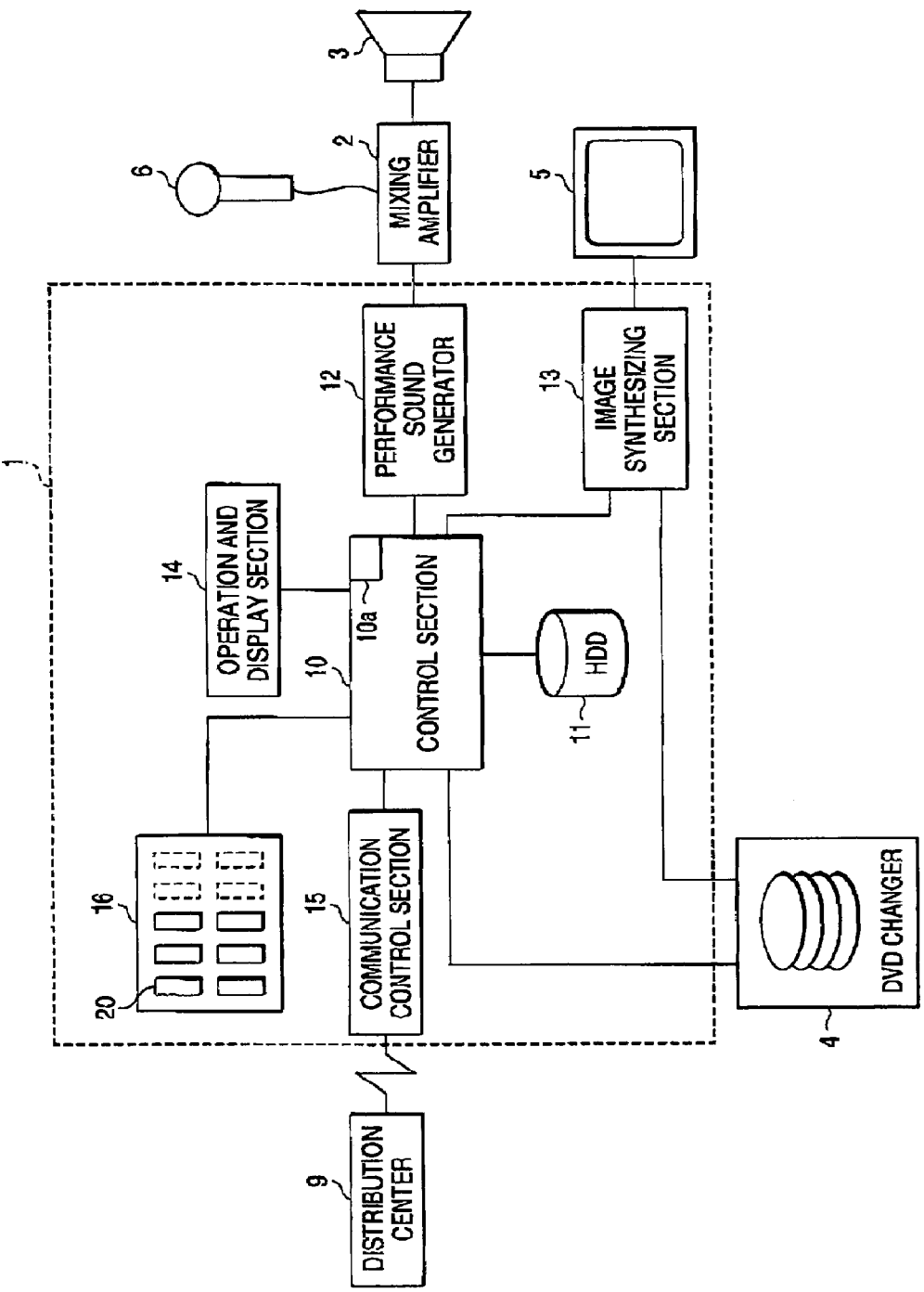
FIG. 1 is a diagram of the configuration of a karaoke apparatus which is an embodiment of the present invention.

FIG. 1 is a diagram of the configuration of a karaoke apparatus which is an embodiment of the present invention. The karaoke apparatus includes an apparatus main unit 1, a mixing amplifier 2, a loudspeaker 3, a DVD (i.e., Digital Versatile Disk) changer 4, a monitoring device 5, a microphone 6, and the like. The apparatus main unit 1 is connected to a distribution center 9 through a telephone line.

The apparatus main unit 1 has a control section 10, a hard disk 11, a performance sound generator 12, an image synthesizing section 13, an operation and display section 14, a communication control section 15, a ROM (i.e., Read Only Memory) socket group 16, etc. The control section 10 has a CPU (i.e., Central Processing Unit), a ROM (i.e., Read Only Memory), and a RAM (i.e., Random Access Memory). The control section 10 controls the operation of the whole karaoke apparatus, and generates a telop of words on the basis of word data in music piece data. As shown in FIG. 2, the hard disk 11 stores music piece data of a plurality of music pieces. In a second embodiment described later, key data is stored in the hard disk 11.

The performance sound generator 12 has a sound source, a PCM decoder, and synthesizes performance sounds of instruments on the basis of data of the performance track of the music piece data, plus reproduces PCM data of a background chorus. The image synthesizing section 13 receives a video signal of a background image reproduced by the DVD changer 4 and character patterns of words generated by the control section 10. The image synthesizing section 13 superimposes the character patterns on the background image, and applies a superimposing process on the character patterns. The operation and display section 14 includes a remote controller and a remote control receiver. The operation and display section 14 receives a request of a karaoke music piece (an input of a music piece number), and displays the received music piece number.

The communication control section 15 is a circuit section for conducting communication with the distribution center 9 through the telephone line. The distribution center 9 downloads music piece data, key data which will be described later, and the like to the karaoke apparatus, and uploads log data including the performance history of each karaoke music piece from the karaoke apparatus. When communication between the distribution center 9 and the karaoke apparatus is established, it is confirmed that the karaoke apparatus is connected to the telephone line of a predetermined phone number and has not been subjected to theft or the like, and the karaoke apparatus is allowed to be continuously transacted.

A ROM 20 has stored key data which allows performance of music piece data of a managed music piece. The ROM 20 is set in a ROM socket group 16. Most of karaoke music pieces which are to be performed by the karaoke apparatus are allowed to be performed without referring to key data. By contrast, some of karaoke music pieces are so-called managed music pieces each of which is allowed to be performed in each of karaoke apparatuses by the copyright holder of the music piece. Also, music piece data of such managed music pieces are stored together with the other music piece data in the hard disk 11. In order to perform one of the managed music pieces, the ROM 20, which has key data stored therein corresponding to the managed music piece, must be inserted into the ROM socket group 16. In other words, key data, which allows performance of one of the managed music pieces, is written into the ROM 20 inserted into the ROM socket group 16. In the ROM socket group 16, a plurality of sockets are disposed so that a plurality of ROMs 20 can be inserted into the ROM socket group 16. When performance of one of the managed music pieces is requested, the control section 10 checks whether the ROM 20, which has key data stored therein corresponding to the music piece, is inserted or not into the ROM socket group 16. If the ROM is inserted, the music piece data of the managed music piece read out, and the karaoke music piece is then performed.

The performance sounds generated by the performance sound generator 12 are input to the mixing amplifier 2. The vocal microphone 6 is connected to the mixing amplifier 2. The singer sings the karaoke music piece in harmony with the performance sounds generated by the performance sound generator 12, and the singing voice is input to the mixing amplifier through the microphone 6. The mixing amplifier 2 mixes the singing voice input from the microphone 6 with the performance sounds of the karaoke music piece input from the performance sound generator 12, adds effects such as echo to the mixture, and then outputs the resulting sounds through the loudspeaker 3. The word telop and the background image, which are combined with each other by the image synthesizing section 13, are displayed on the monitoring device 5.

Figures 2A, 2B:
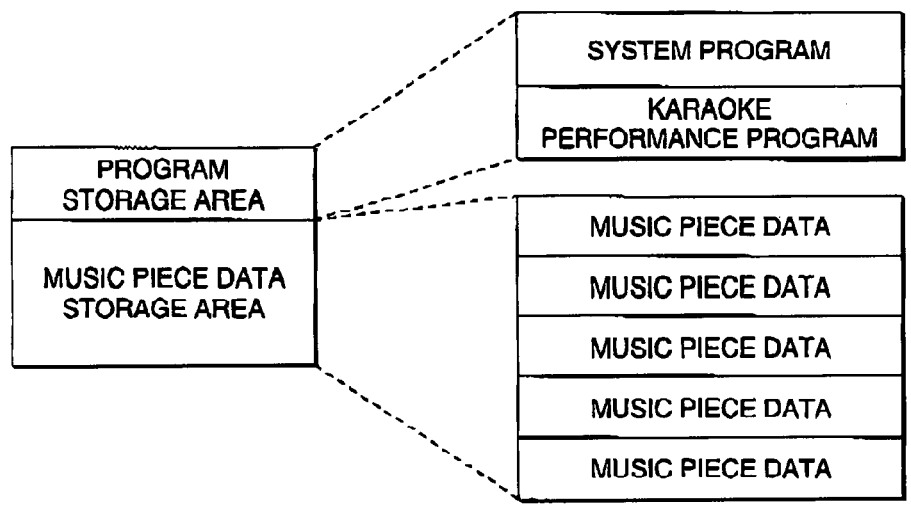
FIGS. 2A and 2B are diagrams illustrating stored contents of a hard disk of the karaoke apparatus.

FIGS. 2A and 2B are diagrams illustrating stored contents of the hard disk 11. As shown in FIG. 2A, a music piece data storage area, a program storage area, and a music piece number table are set in the hard disk 11. Programs such as a system program and a karaoke performance program are stored in the program storage area. When the main unit of the karaoke apparatus is activated, the programs are read into the RAM of the control section 10. Music piece data of the plurality of karaoke music pieces are stored in the music piece data storage area. The music piece data are identified by their music piece numbers. The music piece data include music piece data of so-called managed music pieces in addition to usual music piece data.

As shown in FIG. 2B, correspondingly with the music piece numbers, the music piece number table stores directories where music piece data of the respective music piece numbers are stored, the titles of the music pieces, and an indication whether the music piece is a managed music piece or not.

The key data stored in each of the ROMs 20 may be a code such as the registration number of the music piece data of the corresponding managed music piece, or the performance allowance number. The karaoke apparatus may check the existence of the code and then start the performance. Alternatively, music piece data of each managed music piece may be encrypted, and the key data stored in the ROM 20 may be a key for decrypting the encrypted data.

In the case where the key data is a registration number or the performance allowance number, the registration number (performance allowance number) of music piece data of each of the managed music pieces is stored in the header of the music piece data of the managed music piece, or in a registration number (performance allowance number) table disposed in another area of the hard disk. When one of the managed music pieces is requested, the registration number (performance allowance number) corresponding to the music piece is read out from the header or the table, and a ROM storing the registration number (performance allowance number) is searched. Performance of the music piece is started only when the ROM exists.

In the case where the key data is a decryption key, when one of the managed music pieces is requested, the music piece data of the music piece is read out, and a ROM 20 storing the key data corresponding to the music piece is searched. If the key data exists, the key data is read out, and the encrypted music piece data is decrypted by using the key data. Then, karaoke performance is conducted by using the decrypted music piece data. All of the music piece data of each managed music piece may be encrypted. Alternatively, only part of the data, such as the performance track may be encrypted. From the viewpoint of management of music piece data, it is convenient not to encrypt the header.

Hereinafter, the operation of the karaoke apparatus will be described with taking as an example the case where the key data is a decryption key. FIG. 3 is a flowchart showing the operation of the karaoke apparatus. The flowchart shows the operation which is conducted in response to a request for a karaoke music piece. First, the singer inputs the music piece number of a selected music piece (see S1). Then, the music piece is searched from the music piece number table, and it is judged whether the music piece is a managed music piece or not (See S2 and S3). If the music piece is not a managed music piece, the music piece data of the karaoke music piece is read out from the music piece data storage area of the hard disk 11 (see S4), and the karaoke performance is then started (see S10).

By contrast, if the music piece is a managed music piece, the ROM 20 storing the key data corresponding to the music piece is searched for in the ROM socket group 16 (see S5). If the corresponding ROM 20 is not in the ROM socket group 16 (see S6), a statement that the music piece cannot be performed is displayed on the monitoring device 5 (see S11), and the operation is then ended.

If the corresponding ROM 20 is set in the ROM socket group 16, key data serving as a decryption key is read out from the ROM 20 (see S7), and the music piece data of the karaoke music piece (managed music piece) is read out from the music piece data storage area of the hard disk 11 (see S8). The encrypted music piece data is decrypted by using the key data (see S9), and performance of the karaoke music piece using the decrypted music piece data is started (see S10).

As described above, in the karaoke apparatus, even in the case where a plurality of managed music pieces are allowed to be performed, it is not required to prepare a disc medium such as a CD-ROM or a DVD (i.e., Digital Versatile Disk) for each of the managed music pieces, and hence the karaoke apparatus can easily be transacted. Since music piece data can be read out from the hard disk, it is possible to shorten the time period from an input of a request to the start of performance.

Figure 4A:
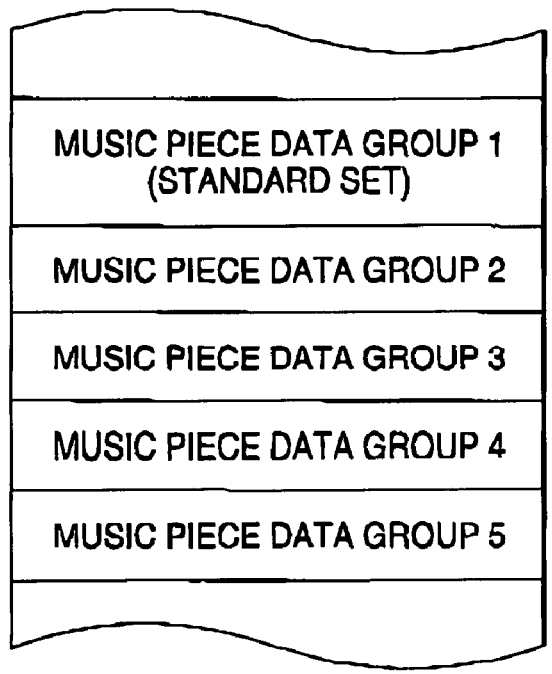
FIGS. 4A and 4B are diagrams illustrating stored contents of a hard disk of a karaoke apparatus which is another embodiment of the present invention.
Figure 4B:
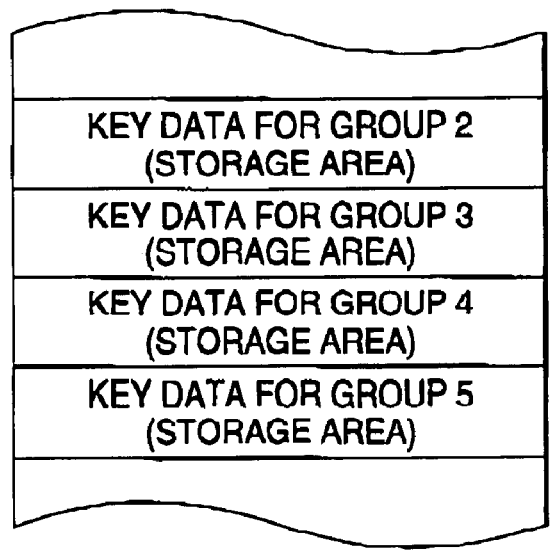

Next, another embodiment of the present invention will be described. The hardware configuration of the embodiment is identical with that of the block diagram of FIG. 1. The ROM socket group 16 may be included or may not be included. The hard disk 11 stores music piece data in groups as shown in FIG. 4A. Group 1 is a standard set in which music pieces can be performed by all karaoke apparatuses. Groups 2 to 5 are additional sets for a specific karaoke apparatus. For example, each of the additional sets contains a group of such as that of folk songs which are sung only in the Okinawa district, or that of children's songs and animation songs which are used only in apparatuses designed for children. In order to perform a music piece of a group other than the standard set, it is necessary to previously obtain a key corresponding to the music piece. Such a key can be supplied in the form of the ROM 20 in the same manner as the first embodiment, or can be obtained by downloading online key data from the distribution center 9. As shown in FIG. 4B, the key data is stored in a key data storage area of the hard disk 11.

Figure 5:
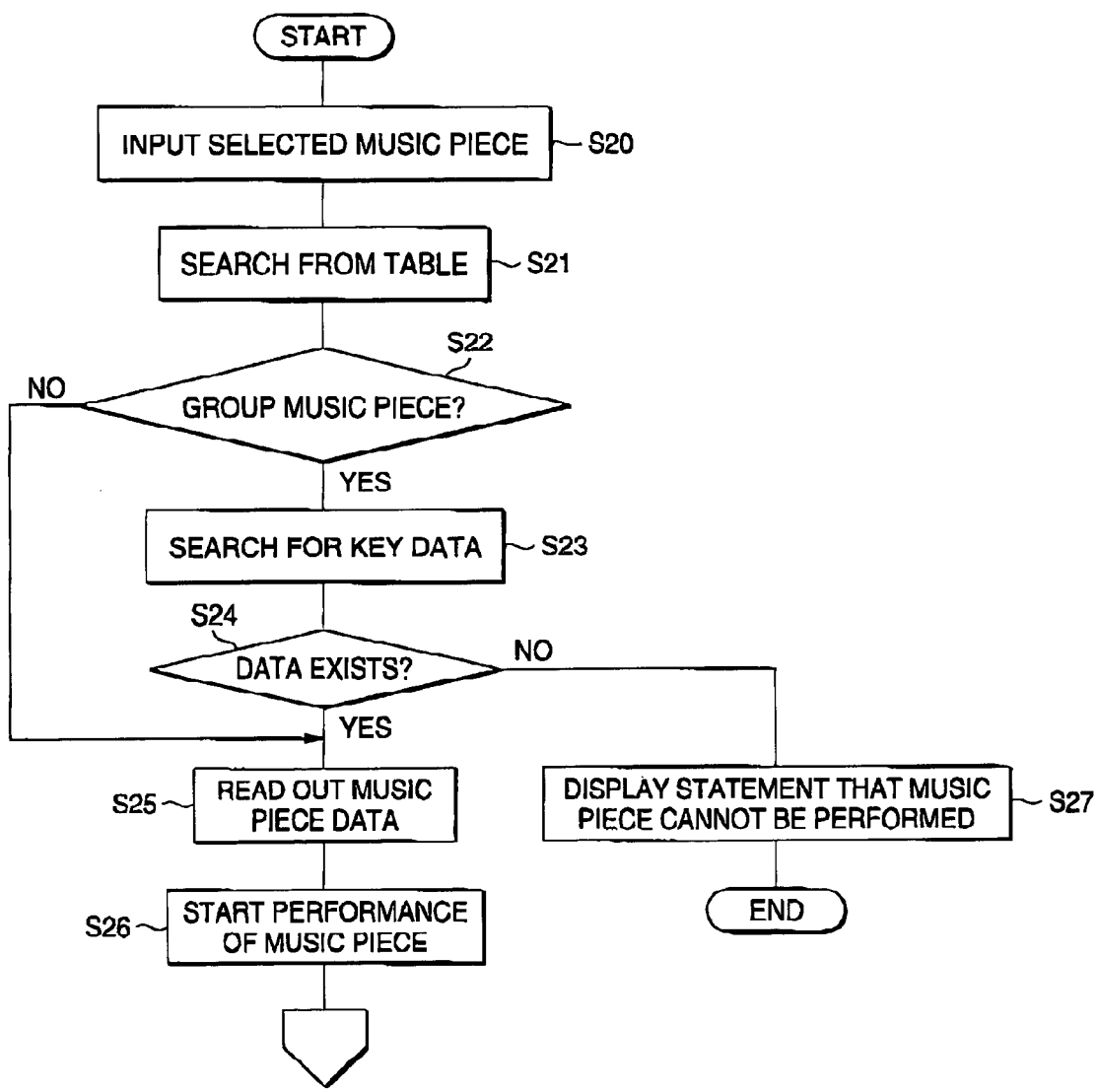
FIG. 5 is a flowchart showing the operation of the karaoke apparatus.

The operation of the karaoke apparatus of the embodiment will be described with reference to FIGS. 5, 6A, 6B, and 6C. FIG. 5 is a flowchart showing the operation when a request for a karaoke music piece is made. First, the singer inputs the music piece number of a selected managed music piece (see S20). Then, the music piece is searched from the music piece number table, and it is judged whether the music piece is a group music piece or not (see S21 and S22). If the music piece is not a group music piece or is a karaoke music piece of the standard set, the music piece data of the karaoke music piece is read out from the directory for the standard set in the music piece data storage area of the hard disk 11 (see S25), and the karaoke performance is then started (see S26).

By contrast, if the music piece is a group music piece, the key data storage area is checked to determine whether the key data corresponding to the music piece or the group is stored therein (see S23). If the corresponding key data is not stored in the key data storage area (see S24), a statement that the music piece cannot be performed is displayed on the monitoring device 5 (see S27), and the operation is then ended.

If the corresponding key data is stored in the key data storage area, the music piece data of the karaoke music piece is read out from the directory for the corresponding group in the music piece data storage area of the hard disk 11 (see S25), and performance of the karaoke music piece using the music piece data is started (see S26).

Figure 6A:
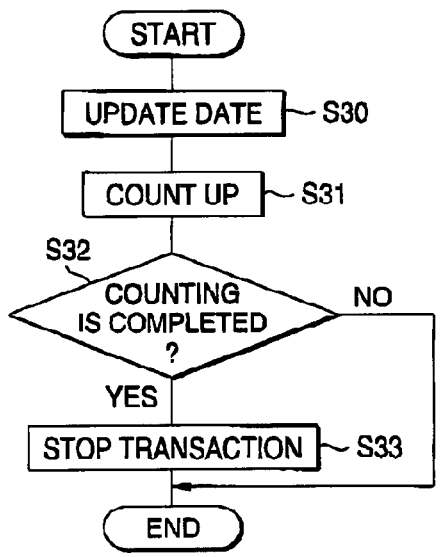
FIGS. 6A, 6B, and 6C are flowcharts showing the operation of the karaoke apparatus.
Figure 6B:
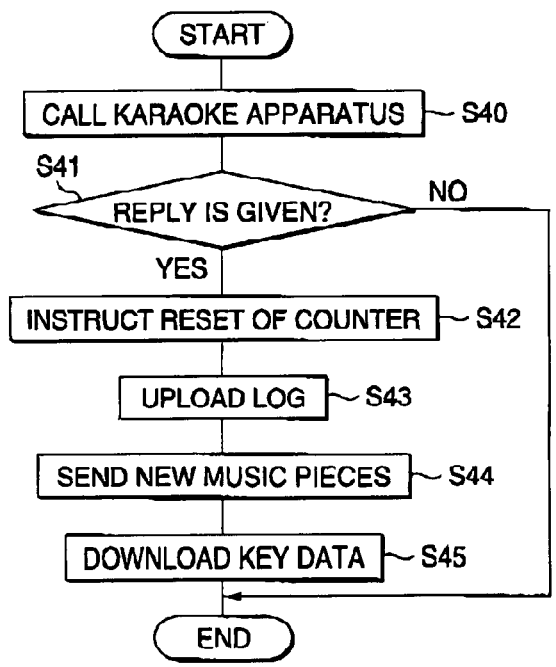
Figure 6C:
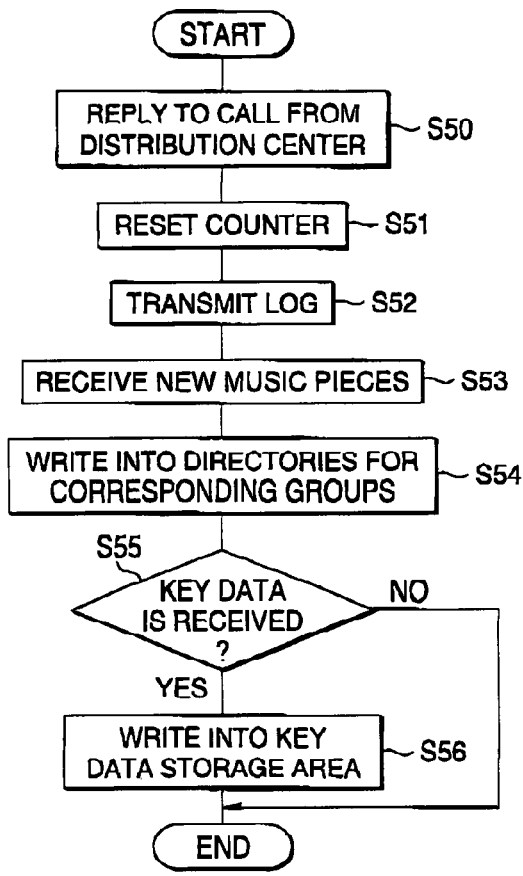

FIGS. 6A, 6B, and 6C are flowcharts showing the operation of deciding whether performance of a karaoke music piece is allowed or not. FIG. 6A is a flowchart showing the operation of counting the number of days. This operation is implemented about one time per day. In the karaoke apparatus, the control section 10 has a calendar function, and includes a counter 10a for counting the number of days. In the counter 10a, the counting is completed by the elapse of two weeks (fourteen days). When the counting of the counter 10a is completed, the system program stops the transaction of the karaoke apparatus. The counter 10a can be reset through communication with the distribution center 9. When the date in the calendar is updated (see S30), the day-number counter is counted-up (see S31). When the counting is completed as a result of the counting-up (see S32), the transaction of the karaoke apparatus is stopped (see S33). Namely, even when a karaoke music piece is requested, the karaoke music piece is not performed.

FIGS. 6B and 6C are flowcharts showing the operation of communicating with the distribution center 9 to send and receive predetermined data and reset the counter. FIG. 6B is a flowchart showing the operation of the distribution center. In order to conduct maintenance on the karaoke apparatus, the distribution center periodically calls the apparatus (see S40). If a reply is given, the following process is implemented, and, if no reply is given, the operation is ended and the calling is again tried at a predetermined time interval (see S41).

If a reply is given, the distribution center instructs the karaoke apparatus to reset the counter (see S42), uploads a transaction log of the karaoke apparatus (see S43), and sends music piece data of new music pieces to the apparatus (see S44). When there is a group of music pieces which are newly allowed to be performed by the karaoke apparatus, the distribution center downloads key data for the group of music pieces which are newly allowed to the apparatus (see S45).

FIG. 6C is a flowchart showing the operation of the karaoke apparatus in response to a telephone call from the distribution center 9. When a telephone call from the distribution center 9 is received, the karaoke apparatus replies to the call (see S50). In accordance with instructions from the distribution center, the day-number counter is reset (see S51). As a result, the transaction of the karaoke apparatus is enabled for two weeks after this resetting even when communication with the distribution center is not conducted. The apparatus transmits the transaction log subsequent to the previous communication, and then clears the log (see S52). Thereafter, the apparatus receives music piece data of new music pieces from the distribution center (see S53), and writes the music piece data into the directories for the groups respectively corresponding to the music piece data (see S54). Next, it is judged whether key data is sent (see S55). If key data is sent, the key data is received, and then written into the key data storage area (see S56). Thereafter, the operation is ended.

As a result, performance of a music piece of the standard set is allowed under conditions that the karaoke apparatus is connected to a predetermined telephone line, and performance of a music piece of the groups other than the standard set is allowed, provided that there is individual key data for the music piece. Therefore, it is not necessary to conduct an individual process of storing only performance-allowed music pieces into the karaoke apparatus. All music pieces can be previously stored in the karaoke apparatus, and the use of music piece data of only performance-allowed music pieces is enabled by using key data. The control of allowance/disallowance of performance can easily be conducted on each karaoke apparatus.

Since the transaction of the karaoke apparatus is stopped when the counting of the day-number counter is completed, the karaoke apparatus is inhibited from being transacted for a long term when it is not confirmed that the karaoke apparatus is connected to the telephone line of a predetermined phone number and installed in the correct place. This prevents the karaoke apparatus from being unauthorizedly transacted.

In the present invention, a karaoke music piece which is allowed by key data in the ROM 20 to be performed is not restricted to a managed music piece. The grouping of karaoke music pieces may be conducted by any method.

In the above, the embodiments in which the present invention is applied to music piece data for karaoke performance and a karaoke apparatus have been described. The present invention is not restricted to them, and may be applied also to any kind of content data such as audio data or visual data, and a content reproducing apparatus.

As described above, according to the embodiments of the present invention, a storage medium having stored therein key data is used. Even with respect to music piece data which requires individual allowance of performance, such as so-called managed music pieces etc., it is not necessary to respectively store the music piece data on separate media. Allowance/disallowance of performance can be simply controlled by a storage media, and the number of allowed performances can be physically managed by the storage media.

Since a storage medium having stored therein key data is used, even with respect to content data which require individual allowance of reproduction, such as so-called managed music pieces etc., it is not necessary to respectively store the content data on separate media. Allowance/disallowance of reproduction can be simply controlled by the storage media, and the number of allowed reproductions can be physically managed by the storage media.

According to the embodiments of the present invention, since allowance/disallowance of performance of a previously stored music piece is managed by key data, downloading music piece data of a performance-allowed music piece can be eliminated, which allows efficient management of performance-enabled music pieces for each of karaoke apparatuses.

Furthermore, since allowance/disallowance of reproduction of contents which are previously stored is managed by key data, downloading reproduction-allowed content data can be eliminated, so that reproduction-enabled content data can be efficiently managed for each of content reproducing apparatuses.

It is contemplated that numerous modifications may be made to the karaoke apparatus, the content reproducing apparatus, the method of managing music piece data for a karaoke apparatus, and the method of managing content data for a content reproducing apparatus, of the present invention without departing from the spirit and scope of the invention as defined in the following claims.

What is claimed is:

1. A content reproducing system, comprising:
 a plurality of content reproducing apparatuses, each of the content reproducing apparatuses including:
  a storage device that stores content data which is identical to each other among the plurality of content reproducing apparatuses, wherein the content data includes a first group for reproducing at least one of audio or visual content which needs allowance for reproducing and a second group for reproducing at least one of audio or visual components which do not need allowance for reproducing, and the storage device has a key data storage area which stores key data for allowing the content reproducing apparatus to reproduce the content data; and
  a controller for performing reproduction of the first group when reproduction of the content data is requested, provided that the key data corresponding to the first group has been stored in the key data storage area of the storage device; and
 a center that separately sends the key data to the corresponding content reproducing apparatus to separately manage the first group of the content data for each of the content reproducing apparatuses.

2. The content reproducing system according to claim 1, wherein the center distributes the same content data to the plurality of content reproducing apparatuses.

3. The content reproducing system according to claim 1, wherein the center downloads the key data online.

4. The content reproducing system according to claim 1, wherein the content reproducing apparatus is provided with a medium connection device to which a non-volatile storage medium having stored therein the key data is to be connected.

5. The content reproducing system according to claim 1, wherein the content reproducing apparatus is a karaoke apparatus, and the content data includes music piece data.

6. A content reproducing apparatus that constitutes a part of a content reproducing system including a plurality of content reproducing apparatuses and a center for managing the plurality of the content reproducing apparatuses, the content reproducing apparatus comprising:
 a storage device that stores content data which are identical to one another stored in other content reproducing apparatuses, wherein the content data include a first group for reproducing at least one of audio or visual content which needs allowance for reproducing and a second group for reproducing at least one of audio or visual components which do not need allowance for reproducing, and the storage device has a key data storage area which stores key data for allowing the content reproducing apparatus to reproduce the content data; and
 a controller for performing reproduction of the first group when reproduction of the content data is requested, provided that the key data corresponding to the first group has been stored in the key data storage area of the storage device,
 wherein the key data is sent from the center of the content reproducing system.

7. The content reproducing apparatus according to claim 6, wherein the content data stored in the storage device is downloaded from the center online.

8. The content reproducing apparatus according to claim 6 further including a medium connection device to which a non-volatile storage medium having stored therein the key data is to be connected.

9. The content reproducing apparatus according to claim 6, wherein the content reproducing apparatus is a karaoke apparatus.

10. A method for controlling a distribution center to manage a plurality of content reproducing apparatuses, comprising:
 periodically calling, by the distribution center, the plurality of content reproducing apparatuses, each of the content reproducing apparatuses including a storage device that stores content data which is identical to each of the other content reproducing apparatus, the content data including a first group for reproducing at least one of audio or visual content which needs allowance for reproducing and a second group for reproducing at least one of audio or visual components which do not need allowance for reproducing, wherein the storage device has a key data storage area which stores key data for allowing the content reproducing apparatus to reproduce the content data, and each of the content reproducing apparatuses include a controller for performing reproduction of the first group when reproduction of the content data is requested, provided that the key data corresponding to the first group has been stored in the key data storage area of the storage device, and receiving a reply, at the distribution center, from one of the plurality of content reproducing apparatuses, wherein the distribution center manages supplying of the key data to some of the plurality of content reproducing apparatuses to allow reproduction of the first group of content data.

11. The method according to claim 10, wherein the distribution center initially distributes the same content data to each of the plurality of content reproducing apparatuses.

12. The method according to claim 10, wherein the distribution center downloads the key data online.

13. The method according to claim 10, wherein the content data includes music piece data.

14. The method according to claim 10, further including instructing the one of the content reproducing apparatuses that replied to reset a counter and to upload a transaction log for the one of the content reproducing apparatuses to the distribution center.

15. The method according to claim 14, further including sending new music pieces which need allowance in order to be reproduced by the one of the content reproducing apparatus and downloading key data to the key data storage area of the one of the content reproducing apparatus to allow for the reproduction of the new music pieces.

* * * * *